L. HALL.
Sheep Rack.
No. 55,090. Patented May 29, 1866.
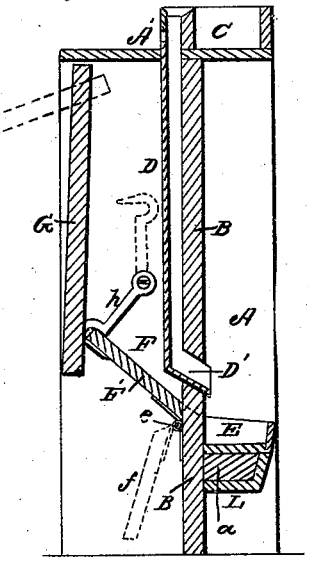
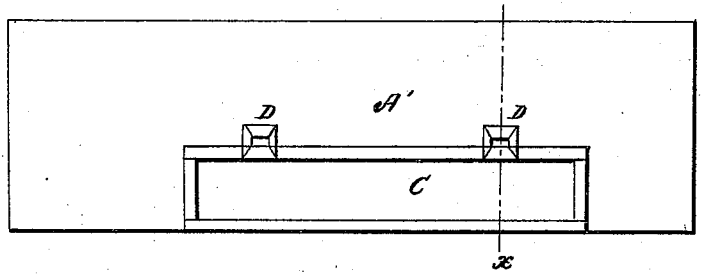
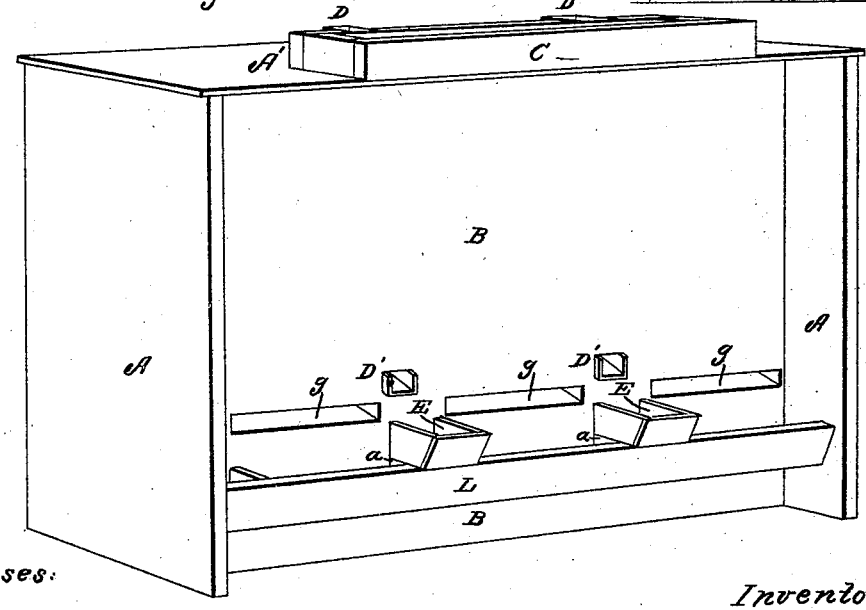
Witnesses:
J. Holmes
A. W. McClelland
Inventor:
Lester Hall

UNITED STATES PATENT OFFICE.

LESTER HALL, OF RICHFIELD, OHIO.

IMPROVEMENT IN SHEEP-RACKS.

Specification forming part of Letters Patent No. 55,090, dated May 29, 1866.

*To all whom it may concern:*

Be it known that I, LESTER HALL, of Richfield, in the county of Summit and State of Ohio, have invented certain new and useful Improvements in Racks for Feeding Sheep, Cattle, &c.; and I do hereby declare that the following is a full and complete description of the same, reference being had to the accompanying drawings, making a part of this specification, in which—

Figure 1 is a perspective view of the rack. Fig. 2 is a top view. Fig. 3 is a vertical section in the direction of the dotted line $x$ $x$ in Fig. 2.

Like letters of reference refer to like parts in the several views.

The frame of the rack consists of end pieces, A A, between which, a little one side of the middle, is a cross-piece, B, and on the top there is a cover or piece, A'.

C is a drawer or bin for containing grain, from one side of which extend down tubes or pipes D, as shown in Fig. 3, that terminate in spouts D' at the lower end, which empty into mangers or troughs E, that extend out from the piece or frame B, as represented in Figs. 1 and 3.

An adjustable rack, F, for containing hay is formed in the back part of the frame by a piece, F', extending lengthwise and hinged to the frame at $e$. It is held in an inclined position by hooks $h$ attached to the ends of the frame, and it can be let down, as indicated by the dotted lines $f$, by turning up the hooks. From this rack are openings $g$ (seen in Fig. 1) through the frame B, that the hay or feed is drawn through by the sheep or cattle.

L is a trough extending the whole length of the frame B underneath the openings $g$, to catch seed and particles that may fall from the hay in feeding. This trough is divided into sections or separate troughs by divisions $a$ under the troughs or mangers, E, and the particles of feed falling in them are prevented from dropping on the ground and thus being wasted.

G is a door or lid hung near the top of the frame, that when let down rests on the edge of the board F', and it can be raised more or less into the position indicated by the dotted lines G', for putting in the hay or feed.

The frame of this rack can be made any size or form suitable to the place in which it is to be made or built, having any desired number of mangers for feeding, and tubes or pipes D communicating with them from the grain trough or drawer C above.

This feeding apparatus is of great service where cattle and sheep, as is often the case, are housed and fed under the barn, the barn being constructed with stables or stalls underneath for this purpose. The grain-trough C can then be above in the barn where the grain and feed are kept, from which it can be measured and thrown into the tubes D, when it will run down into the mangers, thereby avoiding the necessity of carrying it down, which is a great saving of labor.

The openings $g$ are inclined in the plane of the piece F', as noted by the dotted lines $e$ in Fig. 3.

What I claim as my improvement, and desire to secure by Letters Patent, is—

The arrangement of the grain-trough C, tubes or pipes D, mangers E, and trough L with the adjustable rack F, door G, and frame, constructed as and for the purpose described.

LESTER HALL.

Witnesses:
W. H. BURRIDGE,
A. W. McCLELLAND.